United States Patent [19]

Le Van Suu

[11] Patent Number: 5,537,651
[45] Date of Patent: Jul. 16, 1996

[54] PROGRAMMABLE INTERFACE, NOTABLY FOR THE CONTROL OF DOMESTIC INSTALLATIONS

[75] Inventor: Maurice Le Van Suu, Romainville, France

[73] Assignee: SGS-Thomson Microelectronics S.A., Pouilly, France

[21] Appl. No.: 54,595

[22] Filed: Apr. 29, 1993

[30] Foreign Application Priority Data

Apr. 30, 1992 [FR] France ............... 92 05423

[51] Int. Cl.⁶ ............................... G06F 3/06
[52] U.S. Cl. ............... 395/309; 379/107; 370/85.3; 395/280
[58] Field of Search ............... 395/325, 275, 395/107, 309; 370/911; 379/107

[56] References Cited

U.S. PATENT DOCUMENTS

| | | | |
|---|---|---|---|
| 3,932,841 | 1/1976 | Deerfield et al. | 340/172.5 |
| 4,354,226 | 11/1982 | Flickinger et al. | 364/200 |
| 4,627,052 | 12/1986 | Hoare et al. | 370/88 |
| 4,896,349 | 1/1990 | Kubo et al. | 379/107 |
| 4,916,692 | 4/1990 | Clarke et al. | 370/85.1 |
| 4,989,081 | 1/1991 | Miyagawa et al. | 358/93 |
| 5,003,410 | 3/1991 | Endoh et al. | 360/60 |
| 5,144,666 | 9/1992 | Le Van Suu | 380/38 |
| 5,195,092 | 3/1993 | Wilson et al. | 370/94.2 |
| 5,280,587 | 1/1994 | Shimodaira et al. | 395/275 |
| 5,283,638 | 2/1994 | Engberg et al. | 348/14 |

FOREIGN PATENT DOCUMENTS

| | | |
|---|---|---|
| 0175657 | 3/1986 | European Pat. Off. . |
| 0257776 | 3/1988 | European Pat. Off. . |
| 0301736 | 2/1989 | European Pat. Off. . |

OTHER PUBLICATIONS

Patent Abstracts of Japan, vol. 9, No. 79 (P–347) (1802) Nov. 27, 1984 & JP-A-59208603 (Hitachi Seisakusho) May 13, 1983.

*Primary Examiner*—Jack B. Harvey
*Assistant Examiner*—Ami Patel Shah
*Attorney, Agent, or Firm*—David M. Driscoll; James H. Morris; Randy J. Pritzker

[57] ABSTRACT

A programmable interface designed for the reception, on N input ports, of information elements coming from N distinct information transmission input media, wherein the programmable interface includes: one identification circuit capable of receiving the information elements coming from said N input ports, and of giving N distinct identification signals characteristic of the input media: at least one reception circuit for receiving information elements including a programmable input bit controller; and a microprocessor or specialized circuit capable of receiving both the identification signals coming from the identification circuit, and the information elements coming from the reception circuit, the microprocessor controlling a programming element that gives bit control or frame control parameters, characteristic of the input media, to the programmable input bit controller.

22 Claims, 4 Drawing Sheets

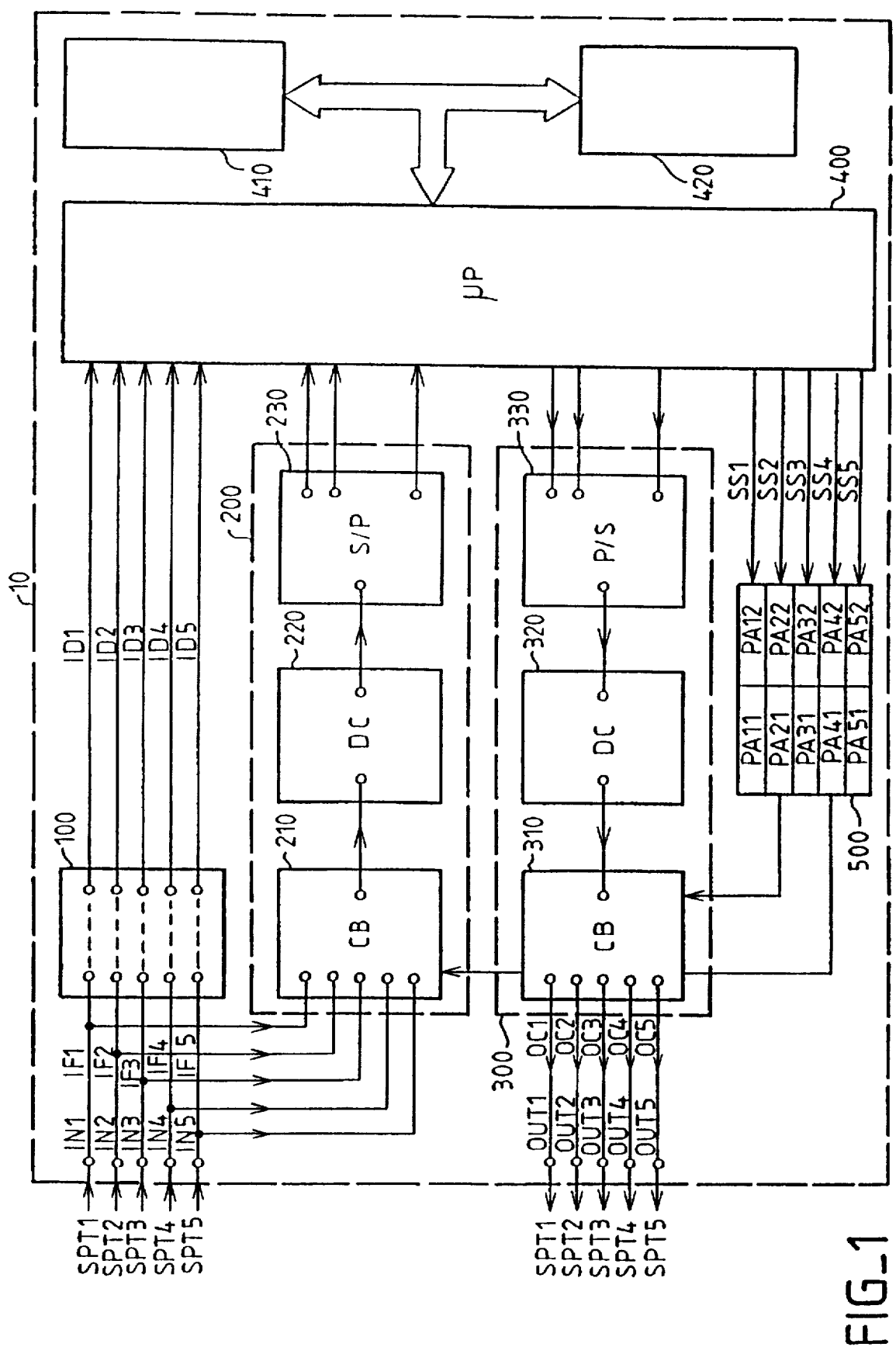
FIG_1

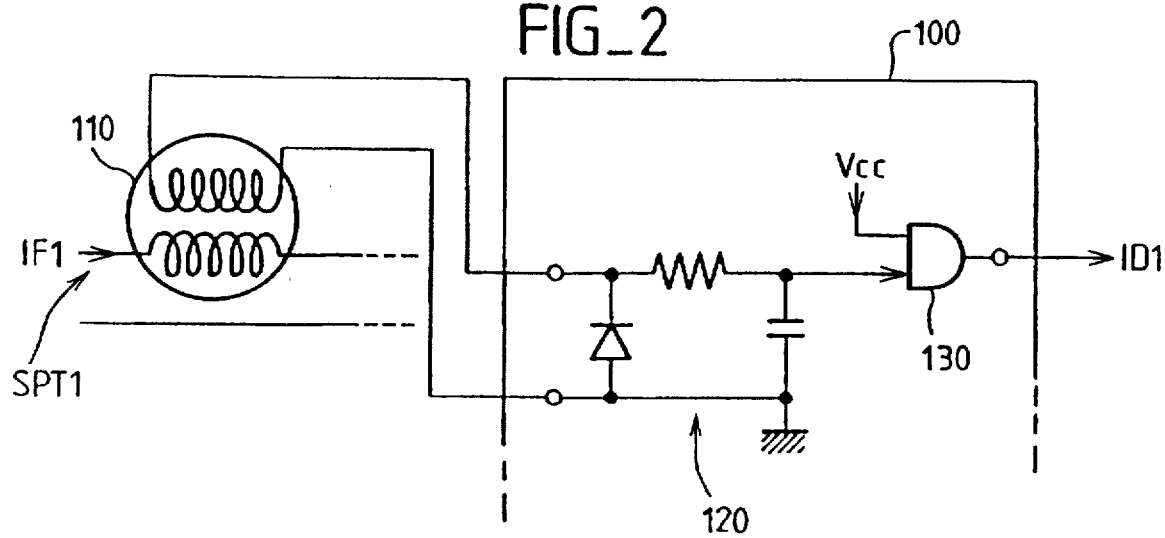
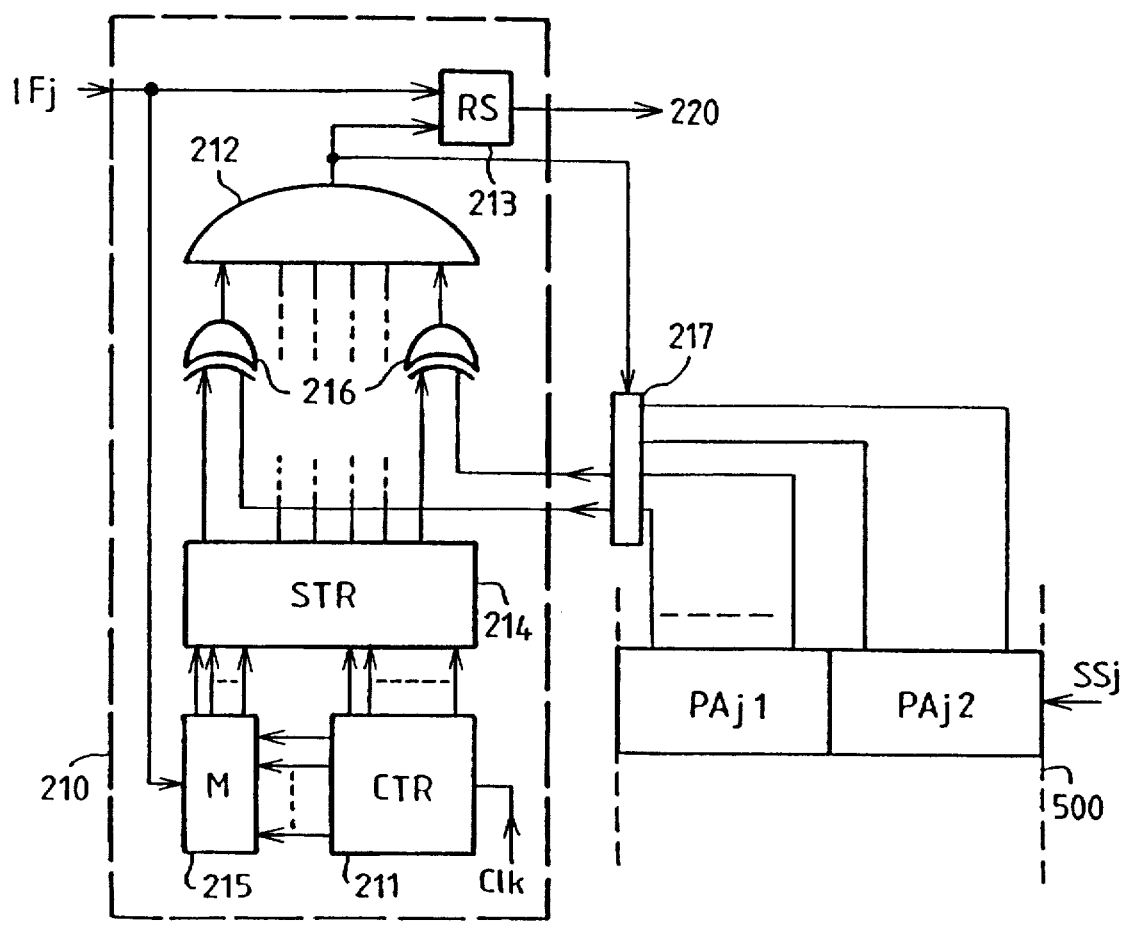

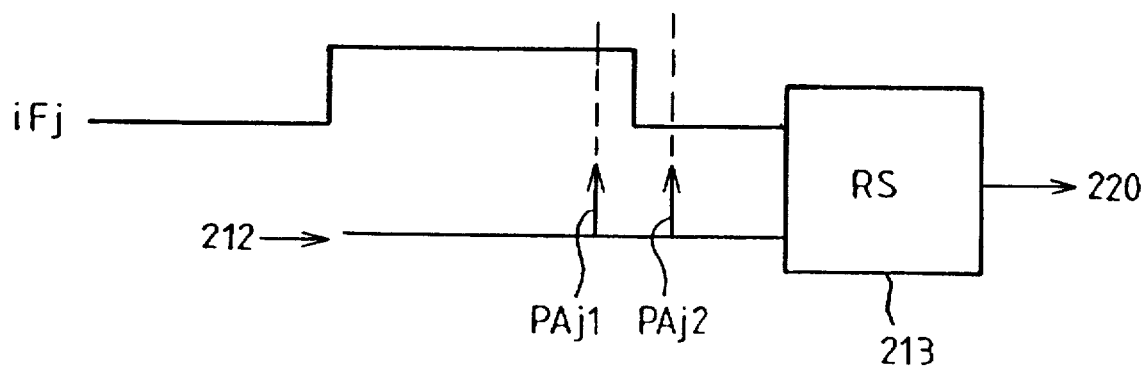
FIG_4

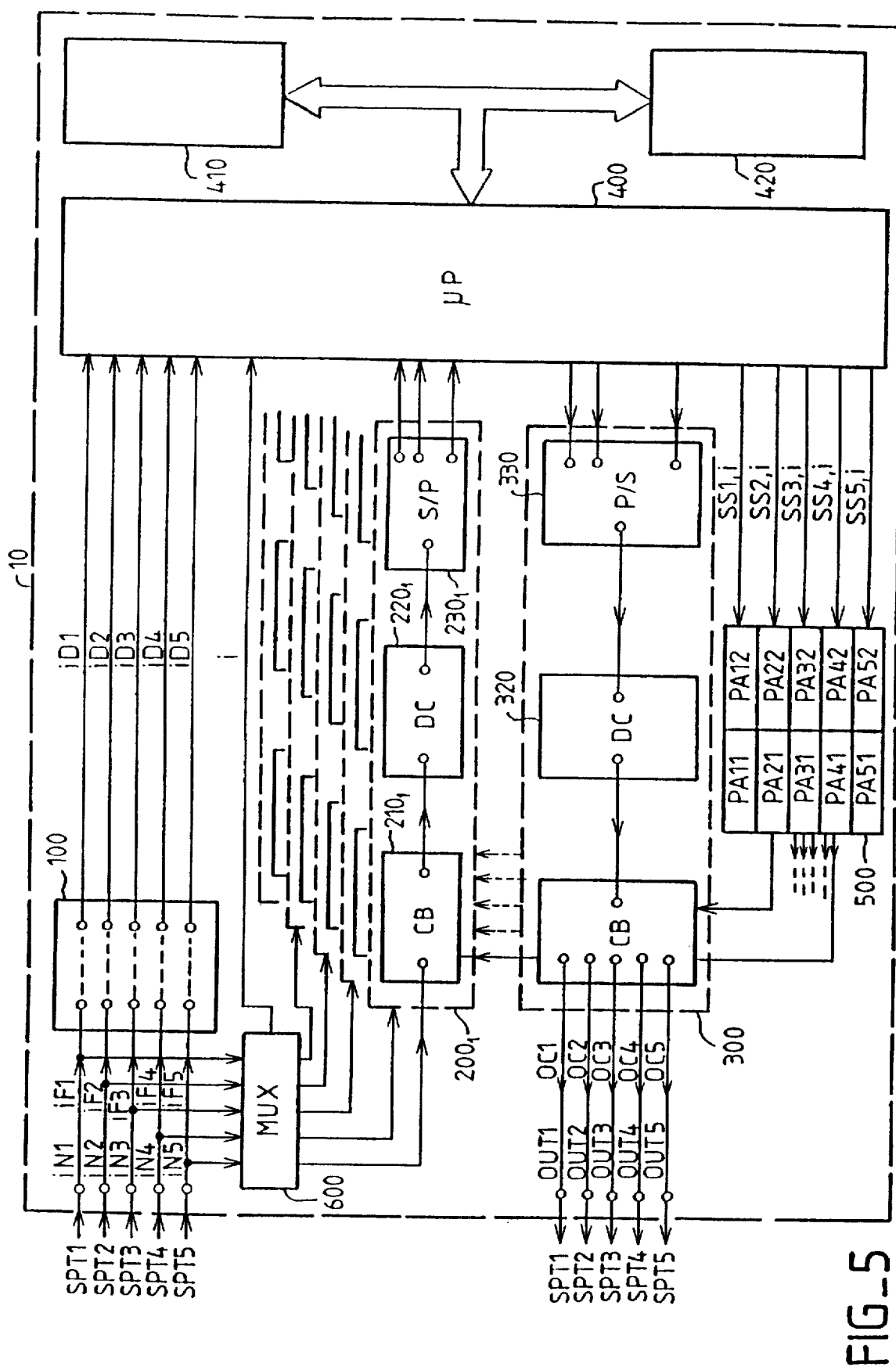
FIG_5

PROGRAMMABLE INTERFACE, NOTABLY FOR THE CONTROL OF DOMESTIC INSTALLATIONS

BACKGROUND OF THE INVENTION

1. Field of the Invention

The present invention relates to a programmable interface designed for the reception, on N input ports, of information elements coming from N distinct information transmission input carriers or media, or coming from one and the same carrier or medium with N distinct inputs.

The invention can be applied in an especially advantageous way in the field of computerized domestic applications involving the management of information for domestic installations.

2. Description of the Prior Art

Known devices for computerized domestic applications generally use five (or even more) distinct types of media for the transmission of information, enabling the devices to be supplied with the information elements that come from the various appliances of the domestic installation to be managed, and that are likely to modify their state of operation, namely turning-on, turning-off etc. These five types of information transmission media include carrier current, twisted pairs, infra-red radiation, coaxial cables and RF links. They may also extend to optical fibers, ultrasonic transmission and other types of media.

For each information transmission medium, the digitized information elements come in the form of words including a succession of bits, the duration of which depends on the medium considered. For example, for transmission by carrier current which is relatively sensitive to noise, the duration of a bit may be 416 µs (which corresponds to 2400 bauds) or 832 µs (which corresponds to 1200 bauds, a value that will become even greater in the future) whereas, for the other information transmission media which are less sensitive to noise, the duration may be of the order of 104 µs or even less (9600 bauds to 1 megabit for twisted pairs or optical fibers).

Furthermore, the working of these known devices generally includes the use of five input bit controllers, the function of which is to ensure that the digitized information elements received by a given information medium include bits whose duration corresponds to the characteristic bit duration for the medium considered. In practice, such bit controllers are usually made in wired logic form and, in a predetermined or fixed mode of operation, their triggering occurs on the rising or descending edge of the signal, the complementary edge being detected through an observation window opened around the expected position for the complementary edge.

The known devices that have just been described therefore all include the drawback of requiring a bit controller for each type of information transmission medium, thus considerably adding to the complexity of their construction.

Hence, the technical problem to be resolved by the present invention is that of providing a programmable interface, in accordance with the introduction, which would enable the use of a single bit controller for, at least, the N information transmission input media.

SUMMARY OF THE INVENTION

The present invention provides a solution to the technical problem raised, by proposing a programmable interface designed for the reception, on N input ports, of information elements coming from N distinct information transmission input media, wherein the programmable interface includes:

one identification circuit capable of receiving the information elements coming from the N input ports, and of giving N distinct identification signals characteristic of the input media;

at least one reception circuit for the information elements, including a programmable input bit controller;

a microprocessor or specialized circuit capable of receiving, both the signals coming from the identification circuit and the information elements coming from the reception circuit, the microprocessor also being capable of controlling a programming element that gives bit control or frame control parameters, characteristic of said input media, to the programmable input bit controller.

Thus, it is possible for the programmable interface of the invention to use only one input bit controller compatible with all the information transmission input media, irrespective of their physical nature. This universal characteristic of operation comes from the fact that the microprocessor, having received an indication from the identification circuit of the nature of the input medium from which an information element has arrived, gives the bit control parameters, characteristic of the input medium used, through the programming element.

The programming element, controlled by the microprocessor, may be of an analog or digital type. For example, they may be RC circuits which define temporal bit control parameters, the values of which are adjusted by the microprocessor by modification of the value of the capacities or of the values of a counter.

However, in a preferred embodiment of the programmable interface according to the invention, the programming element includes a control register including N memory zones containing the bit control parameters that are characteristic of the information transmission media, the register being capable of receiving N signals for the selection of the memory zones from the microprocessor and of giving the bit, frame or format control parameters to the programmable input bit controller.

Furthermore, the invention also provides for a circuit for the sending of commands or information elements given by the microprocessor and including a programmable output bit controller designed to determine that the bits of the commands delivered by the microprocessor are in accordance with the output media by which they are to be sent out. In this case, the control register is also capable of giving the bit control parameters, frame control parameters and, more generally, format control (also known as symbol or field control) parameters to the programmable output bit controller.

It is clear that, with only one reception circuit, the programmable interface according to the invention can process only information elements coming from a single input port corresponding to a given input medium. Hence, in order to enable the simultaneous processing of the N input ports, there is provision, according to the invention, for the interface to include N identical parallel reception circuits connected to the N input ports by an N-channel multiplexer.

BRIEF DESCRIPTION OF THE DRAWINGS

The following description, made with reference to the appended drawings which are provided as non-limiting examples, will give a clear picture of the content of the

3 invention and of the manner in which it can be obtained.

FIG. 1 is a block diagram representing a first embodiment of a programmable interface according to the invention;

FIG. 2 is a schematic diagram representing an identification circuit of the programmable interface of FIG. 1;

FIG. 3 is a block diagram representing a programmable input bit controller of the programmable interface of FIG. 1;

FIG. 4 is a block and timing diagram representing a validation circuit of the programmable input bit controller of FIG. 1; and FIG. 5 is a block diagram representing a second embodiment of a programmable interface according to the invention.

DETAILED DESCRIPTION OF THE INVENTION

FIG. 1 gives a block diagram of a programmable interface 10 designed for the reception, on N=5 input ports IN1, IN2, ... IN5 (i.e. INj with j=1, 2, ... 5) of information elements IFj coming from N=5 distinct information transmission input media SPT1, SPT2, SPT5. These information transmission media may be, non-exhaustively, carrier current, a twisted pair, infra-red radiation, a coaxial cable or a radio frequency. In a domestic installation, the information elements IFj received by the programmable interface are constituted either by indications of the working of certain appliances, an indication of temperature for example, or instructions that are given by the user or are programmed and could modify the operational state of certain other appliances, such as instructions to turn the appliances on or off, etc.

In response to these input information elements, the programmable interface 10 sends out effective commands OCk (k=1, 2, ..., N) to the different appliances, for example a command to turn on a boiler after a drop in temperature or a programmed command to turn on an oven or a cooking surface.

These commands are sent out by N output ports OUTK on N information transmission output media SPTK having the same nature as the N input media SPTj. FIG. 1 shows different input ports INj and output ports OUTK, but it is clear that the different ports may be combined in their functions. This may also be the case with the input information transmission media SPTj and output information transmission media SPTK.

As indicated in the diagram of FIG. 1, the programmable interface 10 of the invention includes an identification circuit 100 capable of receiving said information elements IFj coming from said input ports INj and of giving N distinct identification signals IDj characteristic of said input media SPTj.

By way of an example, FIG. 2 shows the diagram of the channel of the identification circuit 100 assigned to the information elements IF1 conveyed by carrier current, a medium such as this being taken as an input medium SPT1, with j=1. The information signal, modulated in frequency or in amplitude, picked up from the main network line (carrier current) by a transformer 110, is rectified with or without an alternation, and filtered and demodulated by the circuit 120. The signal delivered by the circuit 120 is applied to an input terminal of an AND gate 130, another terminal of which receives voltage Vcc, preferably DC, (which permits processing and comes from a block 400). When there is no information element IF1 on the carrier current SPT1, the

4 identification signal ID1 will be 0, whereas when there is an information element IF1, this identification signal will be equal to 1. This is also true of all the other channels of the identification circuit 100 associated with the other information transmission input media.

FIG. 1 also shows that the programmable interface 10 includes a circuit 200 for the reception of said information elements IFj. As can be seen in FIG. 1, this reception circuit 200 comprises an input bit controller 210 designed to ascertain that the bits coming from a given input medium SPTj have the expected length for this medium, namely 416 or 832 µs for the carrier current and 104 µs for the other information transmission media.

The bit controller 210 is followed by a collision detection circuit 220 which has the function of preventing the superimposition of two information elements coming from a same input medium SPTj. In a standard way, the collision detector 220 may include an AND gate which, in the event of superimposition, delivers a logic 1 at output. The detection of this non-zero output signal reveals the presence of a collision and cancels the sequence in progress, depending on the strategy defined by the application.

As can be seen in FIG. 1, the output of the collision detection circuit 220 is connected to the input of a series-parallel register 230 designed to convert the bits arriving in series into as many parallel channels as the bits forming the information elements IFj. This register 230 includes a number of memory positions equal to the number of bits. During operation, the memory positions of the register 230 are filled successively at the rate of the frequency of the binary signals, and then are emptied simultaneously after all the memory positions have been filled.

It can be seen in FIG. 1 that the programmable interface 10 of the invention includes a microprocessor 400 or specialized circuit, provided with its data memory 410 and program memory 420, and capable of receiving, both the identification signals IDj coming from the identification circuit 100 and the information elements IFj coming from the reception circuit 200, through the input bit controller 210, the collision detection circuit 220 and the series-parallel register 230. All that are described here are the bit control signals, it being understood that the frame and format controls are exactly identical in their principle.

Furthermore, the microprocessor 400 is also capable of giving the command signals OCk by means of a transmission circuit 300 connected to the N output ports OUTk and of controlling a programming element 500 that gives the input bit controller 210 bit control parameters that are characteristic of the information transmission input media SPTj.

In the embodiment shown in FIG. 1, the programming element 500 includes a control register having N memory zones containing bit control parameters characteristic of said input media SPTj. When the input bit controller 210 is triggered at the start of a bit, this bit control parameters may be, for example, two binary words PAj1, PAj2 defining a temporal window for checking an end of a bit associated with each of the information transmission media. Furthermore, the control register 500 is designed to receive, from the microprocessor 400, N signals SSj for the selection of said memory zones to give the input bit controller 210 said bit control parameters that it needs to carry out its control.

The diagram of FIG. 3 illustrates the working of an input bit controller 210 of a programmable interface 10 according to the invention. When an information element IFj travelling through the Jth input medium SPTj is applied to the input port INj, an identification signal IDj given by the identification circuit 100 reaches the microprocessor 400 which, depending on the information that it receives, determines the command OCk to be sent out and the corresponding output medium SPTK.

The microprocessor 400 then delivers a selection signal SSj associated with the input medium SPTj in operation to load the corresponding memory zone in the control register 500, the content of this memory zone, namely the bit end parameters PAj1 and PAj2 and other parameters relating to the frame, being given to the input bit controller 210. In principle, the control register may be a large-sized memory zone including, for example, several words of 8, 16 or 32 bits to suit this complex system of control. The controller 210 includes, for example, a counter 211 controlled by a clock CLK. The state of the counter 211 is transmitted permanently to a memory 215 which is locked to the rising edge or descending edge, depending on the logic chosen, of the signal to be studied, namely the information element IFj. The state of the counter thus memorized in the memory 215 represents the instant of the rising edge of the bit IF1. It is subtracted from the current state of the counter 211 by a subtractor 214, the set formed by the memory 215 and the subtractor 214 constituting a zero-setting device for the counter 211 that is synchronous with the rising or descending edge of the signal to be studied. The subtractor then delivers a counting signal initialized by the rising edge of IF1.

The control parameters PAj1 and PAj2 have, in this case, characteristics (number of bits at a state 1 for example) corresponding to a duration that is respectively smaller than and greater than the duration of the characteristic bit of the input medium SPTj. Each bit of these two binary words is applied in turn to an input of an exclusive-OR gate 216 which also receives, through another input, the corresponding bit coming from the subtractor 214. This application of the binary words, each in turn, is organized by a change-over switch 217 which, at each time, receives the signal sent by the gate 212. As a variant, the AND gate 212 and the exclusive-OR gates 216 are duplicated. Each set receives the outputs of the subtractor 214. Each of the sets respectively receives the words PAj1 or PAj2. In this variant, the two outputs of the AND gate 212 lead to the validation of the RS gate. All the outputs of the exclusive-OR gates 216 are applied to an AND gate 212, the output signal of which, shown in FIG. 4, is a temporal window defined by the two control parameters PAj1 and PAj2. In order to ascertain whether the rising or descending edge of the signal IFj occurs between the instants PAj1 and PAj2, the signal IFj is applied to an input terminal of an R-S or J-K flip-flop 213 sensitive to a loading of a state in the temporal window that comes from the AND gate 212 and is applied to the validation input of the flip-flop 213. If the descending or rising edge of the signal occurs during the opening of the window, the output signal of the flip-flop 213 goes from 0 to 1 or, conversely, if this is not the case, it stays at 0 or at 1.

It will be understood that, owing to the programming achieved by the microprocessor 400 and the programming element 500, the output bit controller 210 of FIG. 3 has a universal character since it can be used for all possible types of information transmission media. For this, it is enough to give it the bit control parameters of the medium considered.

It can be seen, in FIG. 1, that the transmission circuit 300, which is responsible for sending the commands OCk to the output media SPTK by the output ports OUTK, includes a parallel-series register 330 followed by a collision detection circuit 320 and an output bit controller 310. This output bit controller may be of the same programmable type as the input bit controller described in detail further above. Using a selection signal SSk, the microprocessor 400 identifies the memory zone containing the bit control parameters PAk1 and PAk2 corresponding to the output medium SPTK. These control parameters are then given to the programmable output bit controller 310, the working of which is identical to that of the input bit controller 210.

In order to enable the simultaneous processing of the information elements coming from different information transmission input media SPTj, there is provided the embodiment shown in FIG. 5. In this embodiment, the programmable interface 10 includes N identical, parallel reception circuits 200$i$ ($i$=1, 2, . . . , N), connected to the N input ports INj by a multiplexer 600. Thus, as and when the information elements IFj coming from the input media SPTj arrive, the multiplexer sends these information elements to reception circuits with a given index i, and this index is transmitted to the microprocessor 400 in correlation with the identification signal IDj corresponding to the input medium SPTj of the information IFj.

The microprocessor 400 then delivers a selection signal SSj accompanied by the index i of the associated reception circuit 200$i$, so as to give the control parameters PAj1 and PAj2 to the input-bit controller 210$i$ of the reception circuit 200$i$, to which the information element IFj coming from the input medium SPTj has been sent.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A programmable interface for receiving, on N input ports, information elements from N distinct information transmission input media, the programmable interface comprising:

only one identification circuit receiving the information elements from the N input ports, and providing N distinct identification signals characteristic of the input media;

at least one reception circuit, coupled to the identification circuit, receiving the information elements, and including a programmable input bit controller determining whether the information elements are satisfactory for the input media by examining bit durations of the information elements;

a programming element, coupled to the programmable input bit controller, providing bit control parameters or frame control parameters, characteristic of the input media, to the input bit controller; and a microprocessor, coupled to the identification circuit, the reception circuit, and the programming element, receiving the identification signals from the identification circuit and the information elements from the reception circuit on multiple parallel input lines, and controlling the programming element in producing the bit control or frame control parameters on multiple parallel output lines.

2. A programmable interface according to claim 1, wherein the programming element includes a control memory including N memory locations containing the bit control parameters.

3. A programmable interface according to claim 2, wherein the microprocessor produces N selection signals and provides the N selection signals to the control memory for selection of memory locations containing the bit control parameters.

4. A programmable interface according to claim 2, further including:

output media coupled to the microprocessor; and a transmission circuit, coupled to the microprocessor, receiving control signals from the microprocessor, transmitting the control signals to the output media, and including a programmable output bit controller determining whether the control signals are appropriate for the output media.

5. A programmable interface according to claim 4, wherein the control memory is coupled to the output bit controller and provides the bit control parameters to the output bit controller.

6. A programmable interface according to claim 2, wherein the bit control parameters include two binary words, associated with each of the information transmission media, defining a window for checking an end of a bit.

7. A programmable interface according to claim 4, wherein each of the-reception and transmission circuits includes a collision detection circuit detecting a collision of two signals on a same input medium.

8. A programmable interface according to claim 1, further including an N-channel multiplexer coupled to the N input ports, and N reception circuits coupled to the N-channel multiplexer.

9. A programmable interface comprising:

a plurality of input ports receiving information elements from a plurality of information transmission input media;

a single identification circuit receiving the information elements from the plurality of input ports, and providing a plurality of distinct identification signals characteristic of the input media;

at least one reception circuit, coupled to the identification circuit, receiving the information elements, and including a programmable input bit controller determining whether the information elements are satisfactory for the input media by examining bit durations of the information elements;

a programming element, coupled to the programmable input bit controller, and providing bit control parameters, characteristic of the input media, to the input bit controller; and a microprocessor, coupled to the identification circuit, the reception circuit, and the programming element, receiving the identification signals from the identification circuit and the information elements from the reception circuit, and controlling the programming element in producing the bit control parameters.

10. A programmable interface according to claim 9, wherein the programming element includes a control memory including a plurality memory locations containing the bit control parameters.

11. A programmable interface according to claim 10, wherein the microprocessor produces a plurality selection signals and provides the plurality of selection signals to the control memory for selection of memory locations containing the bit control parameters.

12. A programmable interface according to claim 10, further including:

output media coupled to the microprocessor; and a transmission circuit, coupled to the microprocessor, receiving control signals from the microprocessor, transmitting the control signals to the output media, and including a programmable output bit controller determining whether the control signals are appropriate for the output media.

13. A programmable interface according to claim 12, wherein the control memory is coupled to the output bit controller and provides the bit control parameters to the output bit controller.

14. A programmable interface according to claim 10, wherein the bit control parameters include two binary words, associated with each of the information transmission media, defining a window for checking an end of a bit.

15. A programmable interface according to claim 12, wherein each of the reception and transmission circuits includes a collision detection circuit detecting a collision of two signals on a same input medium.

16. A programmable interface according to claim 9, further including a multiplexer coupled to the plurality of input ports, and a plurality of reception circuits coupled to the multiplexer.

17. A programmable interface comprising:

a plurality of means for receiving information elements from a plurality of distinct information transmission media;

a single means for receiving the information elements from the plurality of means for receiving, and for providing a plurality of distinct identification signals characteristic of the information transmission media;

means, coupled to the means for receiving, that receives the information elements, for determining whether a duration of the information elements is satisfactory for the information transmission media by examining bit durations of the information elements;

means, coupled to the means for determining, for providing bit control parameters, characteristic of the information transmission media, to the means for ascertaining; and means, coupled to the means for receiving the information elements, the means for determining, and the means for receiving, that receives the identification signals and the information elements, for controlling the means for providing.

18. A programmable interface according to claim 17, wherein the means for providing includes means for storing the bit control parameters.

19. A programmable interface according to claim 18, further comprising means, coupled to the means for controlling, that receives command signals from the means for controlling, for transmitting the command signals.

20. A method for receiving, on a plurality input ports, information elements from a plurality distinct information transmission input media, comprising the steps of:

providing a single identification circuit to receive the information elements from the plurality of input ports;

providing a plurality distinct identification signals characteristic of the input media;

determining whether bit durations of the information elements are satisfactory for the input media;

providing bit control parameters, characteristic of the input media, to the input bit controller; and controlling the production of the bit control parameters.

21. A method for receiving as claimed in claim 20, further including the step of using a plurality of memory locations within a control memory to store the bit control parameters.

22. A method for receiving as claimed in claim 21, further including the steps of:

producing N selection signals;

providing the selection signals to the control memory; and selecting a memory location within the control memory containing control parameters in response to the provision of the selection signals.

* * * * *